June 25, 1963 R. C. CARSON, JR., ETAL 3,094,896
METHOD AND APPARATUS FOR LAUNCHING ROCKETS
Filed Feb. 27, 1961 4 Sheets-Sheet 1

INVENTORS
RALPH C. CARSON, JR.
SALVATORE J. GRILLO
TOR W. JANSEN
BY
ATTORNEY

June 25, 1963  R. C. CARSON, JR., ETAL  3,094,896
METHOD AND APPARATUS FOR LAUNCHING ROCKETS
Filed Feb. 27, 1961  4 Sheets-Sheet 2

INVENTORS
RALPH C. CARSON, JR.
SALVATORE J. GRILLO
BY  TOR W. JANSEN

ATTORNEY

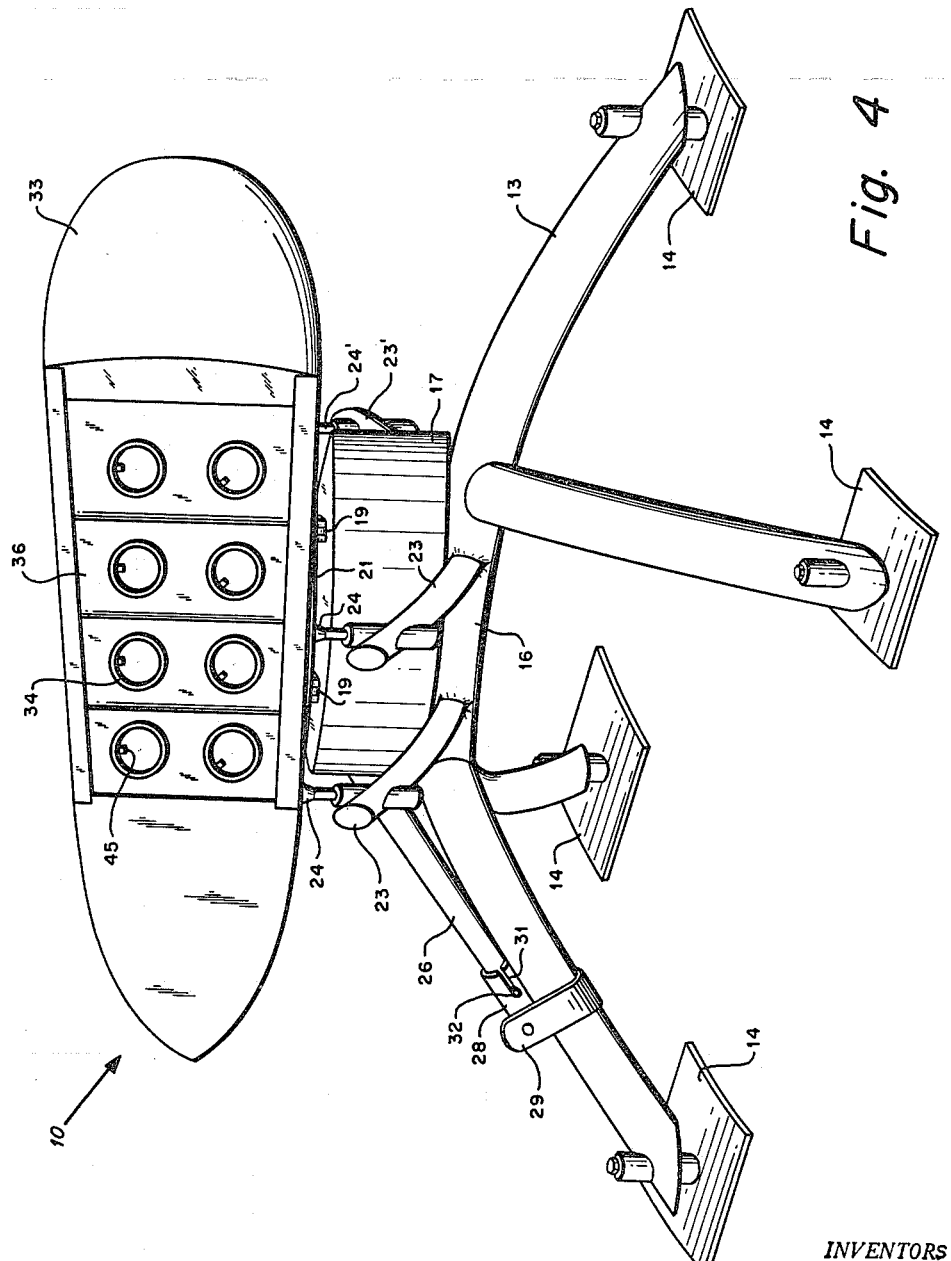

INVENTORS
RALPH C. CARSON, JR.
SALVATORE J. GRILLO
TOR W. JANSEN

BY

ATTORNEY 3,094,896
METHOD AND APPARATUS FOR LAUNCHING ROCKETS
Ralph C. Carson, Jr., Willow Grove, Salvatore J. Grillo, New Britain, and Tor W. Jansen, Southampton, Pa., assignors to the United States of America as represented by the Secretary of the Navy
Filed Feb. 27, 1961, Ser. No. 92,104
2 Claims. (Cl. 89—1.7)
(Granted under Title 35, U.S. Code (1952), sec. 266)

The invention described herein may be manufactured and used by or for the Government of the United States of America for governmental purposes without the payment of any royalties thereon or therefor.

The present invention relates to a method and apparatus for launching a rocket from a vehicle in motion, and more particularly to a method and apparatus for launching a rocket in an upward trajectory from a vehicle in substantially horizontal motion.

Radiosondes of the type characterized in the present invention are generally used for measuring and transmitting various atmospheric conditions. They may be carried upward by balloons, or they may be dropped from aircraft and retarded in descent by a parachute or the like. Both of these methods precluded investigation of large areas over a short period of time. For instance, the balloon radiosonde is inherently slow-rising and its path of ascent cannot be accurately predicted. On the other hand, radiosondes dropped from aircraft are obviously limited to investigations below the maximum altitude at which the aircraft can be safely operated.

A more recent innovation is the rocket-propelled radiosonde, hereinafter referred to as a rocketsonde, which permits rapid investigations at extremely high altitudes. Such rocketsondes have been launched from a ship at sea or from a fixed location on the ground. Hence, the area of interest has been limited to the extent of the ship's capabilities or the number of launcher locations. A more powerful motor in the rocketsonde will obviously extend the rangeability, but usually entails high unit costs prohibitive in investigating large areas on a routine basis.

Accordingly, it is an object of the present invention to provide an improved method and apparatus for launching a rocketsonde whereby the investigating capabilities of radiosonde equipment contained therein are extended, with which the rocketsonde may be launched to a desired altitude beyond its own range, with which the rocketsonde may be launched from a vehicle traveling substantially in a horizontal direction to any desired upward trajectory irrespective of the speed of the vehicle, and with which conventional rockets of relatively low unit costs may be employed.

Another object of the invention is to provide a launching apparatus for a rocket which includes an improved means which safely supports the rocket in the firing position, which automatically releases upon firing of the rocket, and which is unaffected by adverse changes in ambient temperature.

A further object is to provide a method and apparatus for launching a rocketsonde which will be relatively simple, convenient, practical and inexpensive.

Various other objects and advantages will be apparent from the following description of one embodiment of the invention, and the novel features will be particularly pointed out hereinafter in connection with the appended claims.

In the accompanying drawings:

FIG. 1 represents a side elevation of a conventional aircraft with a rocketsonde launcher of the present invention attached thereto and having a graph superimposed thereon of the actual trajectory of a rocketsonde;

FIGS. 2(a) to 2(c) are vector diagrams of the forces exerted on the rocketsonde during rocket-burning;

FIG. 4 represents a perspective view of the rocketsonde launcher of FIG. 1 as viewed from below and forward thereof;

Figure 1:
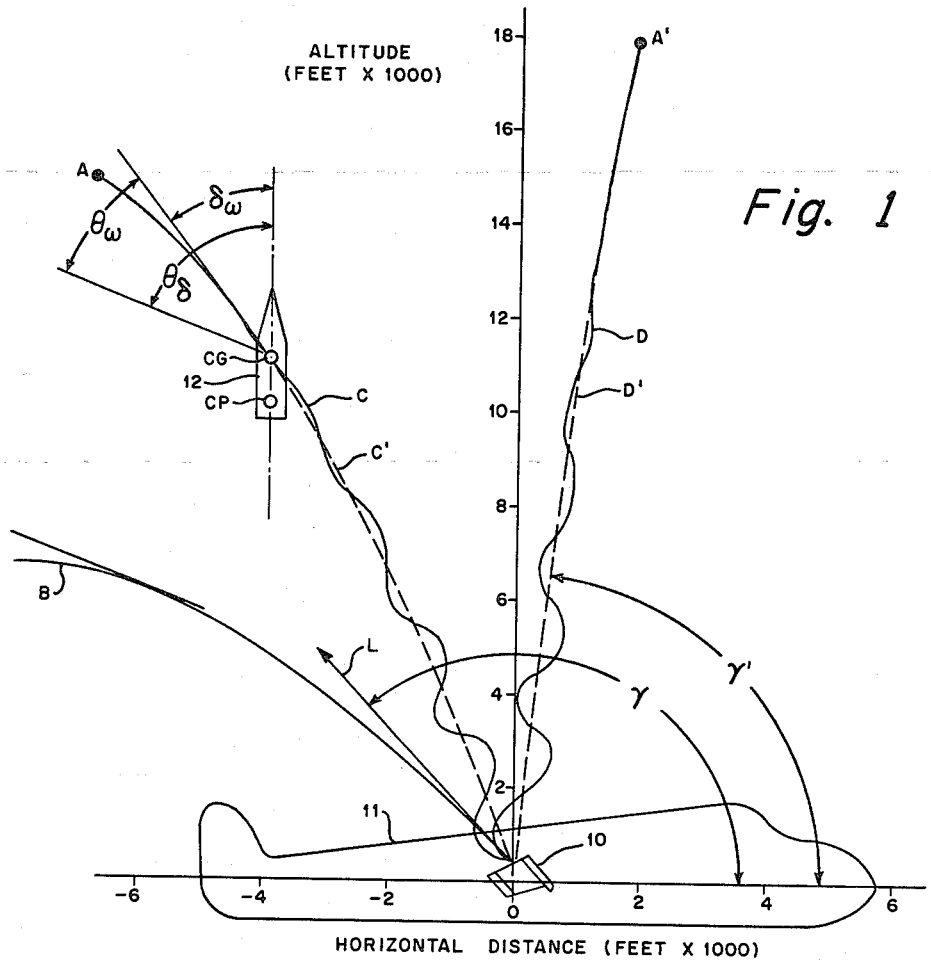

In the illustrated embodiment of the invention, FIG. 1 shows a rocketsonde launcher, generally indicated by the numeral 10, mounted on an aircraft 11 outboard of the fuselage. The launcher 10 is positioned along the length of the fuselage where it is both convenient and aerodynamically stable, and is shown with a launcher line L. Heretofore, rockets have been fired in a forward direction parallel to or 30° above the line of flight of the launching vehicle and produce a generally downward trajectory. The present invention contemplates a rocket to be fired from an aircraft in flight to produce a generally upward trajectory. This trajectory of an upward path consequently necessitates a different launching technique. An exact analysis of the expected trajectories for various launch angles are mandatory in order to practice the invention herein disclosed. As will appear from the following analysis, the rocket is fired in an upward and rearward direction from a horizontal line of aircraft flight in order to produce a generally upward trajectory.

The normal use of rockets as weapons deals with the total trajectory solution since only the first 4000 yards of the trajectory are usually of interest. In order to calculate the complete trajectory of a rocket, such as a rocketsonde 12 diagrammatically illustrated in FIG. 1, two sets of equations must be solved; one for motion during the time the rocketsonde 12 is burning, and another for motion during the time the rocketsonde 12 has burned out. The initial conditions for the solution of the during-burning motion are the position of the launching vehicle or aircraft 11 at the time of the launch, the velocity of the aircraft 11 at the time of launch, and the angle of launch of the rocketsonde 12. For purposes of convention, the angle of launch, $\gamma$, will be measured from the direction of motion of the aircraft 11 and will be taken as positive for counter-clockwise rotations as the aircraft 11 moves from left to right as illustrated in FIG. 1. The burnout configuration of the rocketsonde 12 is obtained from the solution of the during-burning equations of motion. Initial conditions for the solution of the after-burning equations of motion are the position and angular orientation of the rocketsonde 12 at burnout. The position or point A′ at which the rocketsonde 12 stops burning is common to both regions and constitutes the point where the solutions coincide to form the complete trajectory.

Wind created by the motion of the aircraft 11 through the air will cause the rocketsonde 12 to deviate from the launcher line shortly after emerging from the launcher. This deviation, angle $\theta\delta$, tends to reduce the angle, $\gamma$, between the rocketsonde 12 trajectory and the direction of motion of the aircraft. Computation of the corrected trajectory requires a study of the windage and its effect upon the center of mass and the axis orientation of the rocketsonde 12. The results of such a study are the corrections which are introduced to modify the original trajectory.

DURING-BURNING SOLUTION

A. *Calculation of the Projectile Trajectory Neglecting the Torque Due to Wind*

The basic equation of motion along the trajectory, illustrated vectorially in FIG. 2(*a*), is $$M = \frac{dv}{dt} = T - D - M_g \sin \gamma \quad \text{or} \quad \frac{dv}{dt} = \frac{T}{M} - \frac{D}{M} - g \sin \gamma \quad (1)$$

wherein $v$ = velocity of rocketsonde,
$t$ = time,
$T$ = thrust of the rocket (assumed constant),
$D$ = drag of the rocketsonde,
$\gamma$ = angle of launch,
$M$ = mass of the rocketsonde as a function of time, and
$g$ = acceleration due to gravity.

The mass of the rocketsonde, $M$, is reduced by the loss of mass in the process of producing thrust. In general, the reduction is assumed linear, and may be expressed as $M = M_f - M_t t$, wherein $M_f$ = mass of the full rocket, and
$M_t$ = mass of the fuel consumed per unit of time.

The drag, $D$, may be expressed as $D = \rho d^2 k_D v^2$, wherein $\rho$ = density of air,
$d$ = diameter of the rocketsonde, and
$k_D$ = coefficient of drag.

The density of air, $\rho$, can be expressed more completely by the expression $\rho_0 e^{-by}$, wherein $\rho_0$ = density of air at sea level,
$e$ = 2.7183,
$b$ = 3.158 × 10$^{-5}$ feet$^{-1}$, and
$y$ = the ordinate of rocketsonde (altitude).

For the conventional rocketmotors contemplated for use in the present invention, the change of altitude will not appreciably change the value of $e^{-by}$, and thus the density of air, $\rho$, will be substantially constant. Thus Equation 1 becomes $$\frac{dv}{dt} = \frac{T}{M_f - M_t t} - \frac{kv^2}{(M_f - M_t t)} - g \sin \gamma \quad (2)$$

Taylor's series method is particularly suited for the numerical integration processes required for the solution of this type of equation. For simplicity $$v = \frac{1}{\sin \gamma} \frac{dy}{dt}$$

Equation 2 then becomes $$\frac{d^2 y}{dt^2} = -k_1 \frac{(dy)^2}{dt} - k_2 t \frac{(dy)^2}{dt} + k_4 t T \sin \gamma + k_3 T \sin \gamma - g \quad (3)$$

wherein $k_1$, $k_2$, $k_3$, and $k_4$ are constants.

The expressions for the coefficients of the Taylor series for $$\frac{dy}{dt} = a_0 + a_1 t + a_2 t^2 + a_3 t^3 + a_4 t^4 + a_5 t^5$$

are $$a_0 = \frac{dy}{dt}\bigg|_{t=0} \quad a_1 = \frac{d^2 y}{dt^2}\bigg|_{t=0} \quad a_2 = \frac{1}{2} \frac{d^3 y}{dt^3}\bigg|_{t=0}$$

$$a_3 = \frac{1}{6} \frac{d^4 y}{dt^4}\bigg|_{t=0} \quad a_4 = \frac{1}{24} \frac{d^5 y}{dt^5}\bigg|_{t=0} \quad a_5 = \frac{1}{120} \frac{d^6 y}{dt^6}\bigg|_{t=0}$$

wherein $a$'s with subscripts are constants.
Continuing this process the solution for $$\frac{dy}{dt} = v_y$$

becomes $$\frac{dy}{dt} = v_y = (c_1 T \sin \gamma)t + (c_2 T \sin \gamma)t^2 - (c_3 T \sin \gamma)t^3 - (c_4 T \sin \gamma)t^4 - (c_5 T \sin \gamma)t^5$$

and $$y = \int_0^t \frac{dy}{dt} dt = \frac{c_1 T \sin \gamma}{2} t^2 + \frac{c_2 T \sin \gamma}{3} t^3 - \frac{c_3 T \sin \gamma}{4} t^4 - \frac{c_4 T \sin \gamma}{5} t^5 - \frac{c_5 T \sin \gamma}{6} t^6 \quad (4)$$

wherein $c$'s with subscripts are constants.

A similar expression is found for $x$ by solving the equation $$\frac{d^2 x}{dt^2} = -k'_1 \frac{(dx)^2}{dt} - k'_2 \frac{(dx)^2}{dt} + k'_3 T \cos \gamma + k'_4 T \cos t \quad (5)$$

A trajectory B (FIG. 1) of the rocketsonde has been plotted using Equations 4 and 5. This plot represents the trajectory of the rocketsonde when the wind is neglected as a torque-producing force.

B. *Position of Center of Mass and Orientation of Rocket Axis as Influenced by Wind*

FIG. 2(*b*) vectorially illustrates the torque created by the wind force, W, on the rocketsonde 12. The center of pressure (CP) being displaced along the axis of the rocketsonde 12 from the center of gravity (CG), a turning moment will exist whenever the wind force and mass normal to the axis are unequal.

The angular deviation, $\theta_w$, produced by wind of the center of mass of the rocketsonde 12 from the trajectory with no wind consideration is given by $$\theta_w = \tan^{-1} \left( \frac{Wn}{v_D} \theta_\delta + \frac{Wn}{v} \right) \quad (6)$$

wherein $Wn$ = component of wind normal to the direction of motion of the rocketsonde,
$v_D$ = velocity of rocketsonde as it leaves the launcher 10,
$v$ = velocity of rocketsonde at any point along its trajectory, and
$\theta_\delta$ = angular deviation in radians of the rocketsonde from the trajectory B due to yaw of the rocketsonde.

The angular deviation due to yaw, $\theta_\delta$, is defined as $$\theta_\delta = 2\pi \zeta_D \left\{ \left[ c(2\zeta) - C(2\zeta_D) - \frac{1}{2\pi \zeta} \sin^2 \pi \zeta^2 \right] \sin^2 \pi \zeta_D^2 - \left[ s(2\zeta) - S(2\zeta_D) + \frac{1}{2\pi \zeta} \cos^2 \pi \zeta^2 \right] \cos 2\pi \zeta_D^2 \right\} \quad (7)$$

where $$\zeta_D = \frac{v_D}{\sqrt{2G\sigma}} \qquad \zeta = \frac{v}{\sqrt{2G\sigma}}$$

$$c(2\zeta) = \int_0^{2\zeta} \cos \frac{\pi}{2} u^2 du$$

$$C(2\zeta_D) = \int_0^{2\zeta_D} \cos \frac{\pi}{2} u^2 du$$

$$S(2\zeta_D) = \int_0^{2\zeta_D} \sin \frac{\pi}{2} u^2 du$$

$$s(2\zeta) = \int_0^{2\zeta} \sin \frac{\pi}{2} u^2 du$$

and $$G = \frac{\text{burnout velocity} - \text{initial velocity}}{\text{burning time}}$$

The terms $c(2\zeta)$, $C(2\zeta_D)$, $s(2\zeta)$ and $S(2\zeta_D)$ are Fresnel integrals in which $\zeta$ is a dimensionless measure of velocity during burning and $\zeta_D$ is the value of $\zeta$ at launching. In general, $\zeta_D$ will be less than 1 and $\zeta$ will be considerably greater than 1. Under these conditions, $$c(2\zeta_D) \simeq 2\zeta_D - \frac{\pi^2}{40}(2\zeta_D)^5$$

and $$S(2\zeta_D) \simeq \frac{\pi}{6}(2\zeta_D)^3 - \frac{\pi^3}{72}(2\zeta_D)^7$$

Approximating for $\zeta > 1$, $$c(2\zeta) = \frac{1}{2}\sqrt{\frac{\pi}{2}} - \frac{1}{2}\left(\frac{1}{2(2\zeta)^3} - \frac{15}{8(2\zeta)^7} + \cdots\right)\cos(2\zeta)^2$$
$$+ \frac{1}{2}\left(\frac{1}{2\zeta} - \frac{3}{4(2\zeta)^5} + \cdots\right)\sin(2\zeta)^2$$

and $$S(2\zeta) = \frac{1}{2}\sqrt{\frac{\pi}{2}} - \frac{1}{2}\left(\frac{1}{2(2\zeta)^3} - \frac{15}{8(2\zeta)^7} + \cdots\right)\sin(2\zeta)^2$$
$$- \frac{1}{2}\left(\frac{1}{2\zeta} - \frac{3}{4(2\zeta)^5} + \cdots\right)\cos(2\zeta)^2$$

The yaw due to the wind, $\delta_w$, is given by $$\delta_w = \tan^{-1}\left(\frac{Wn}{v_D}\Delta\delta - \frac{Wn}{v}\right)$$

wherein $$\Delta\delta = \frac{\zeta_D}{\zeta}\cos 2\pi(\zeta^2 - \zeta_D^2) \quad (8)$$

$\theta_w + \delta_w$ defines the orientation of the rocketsonde 12 with respect to trajectory B. The angular deviations from the trajectory in which wind is not neglected are the $\theta_w$ (deviation of the center of mass), and the $\delta_w$ (orientation of the rocketsonde axis with respect to $\theta_w$). Thus, the position and orientation of the rocketsonde at all points shown by the trajectory path C and its mean trajectory C′, in point-to-point correspondence with the trajectory in which no wind is taken into account, are available for correction purposes.

C. Incorporation of Corrections Into Trajectory

The effective trajectory D of the rocketsonde 12 and its mean effective trajectory D′ is the incorporation of the corrections $\theta_w$ and $\delta_w$ into the trajectory B. In order to combine the results, as outlined in parts A and B above, the distance $s$ along the trajectory B is calculated from the right-angle relationship, $s = \sqrt{x^2 + y^2}$. The trajectories B and D each initially deviate in a clockwise direction from the launcher line L by virtue of an initial horizontal velocity and the drag thus imparting an oscillation.

The angle $\gamma'$ defines the position of the rocketsonde at any time, 5, with respect to the direction of the aircraft 11. The orientation of the rocketsonde axis will oscillate about the angle $\gamma'$, and $s$ will define a position along the trajectory B. The difference between the trajectory B and the corrected trajectory C is sufficiently small that $s$ can be resolved into the components utilizing the angle $\gamma'$. Hence, the corrected abscissa, $x_c$, is given by $x_c = s\cos\gamma'$, and similarly the corrected ordinate, $y_c$, is given by $y_c = s\sin\gamma'$.

The plot of the effective trajectory D and its mean trajectory D′ emphasizes the oscillation of the rocketsonde, and each point on the trajectory D is the instantaneous position of the rocketsonde. The trajectory D oscillates about the trajectory D′ which represents the path of the rocketsonde or the corrected trajectory. The rocketsonde 12 may be fired with a launch angle $\gamma$, but because of windage, the effective trajectory angle is $\gamma'$.

AFTER-BURNING SOLUTION

Figure 3:
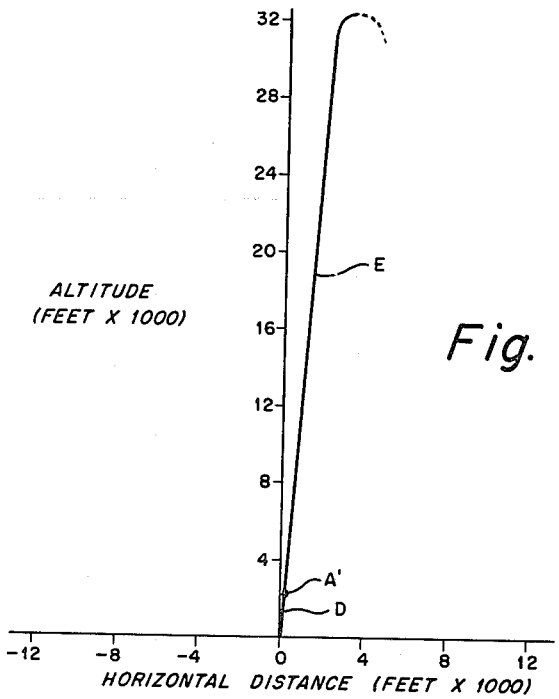
FIG. 3 is a graph depicting the complete trajectory of a rocketsonde launched from an aircraft in flight.
Figure 7:
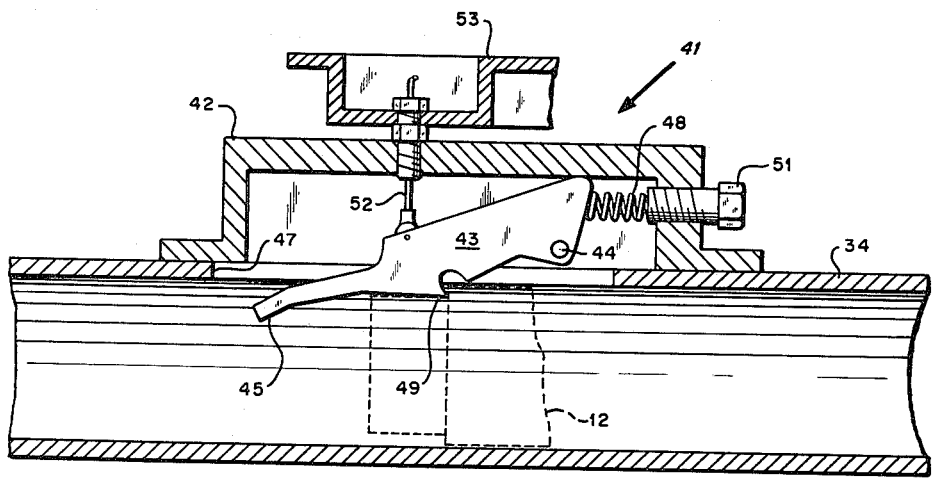
FIG. 7 represents an enlarged view of a latch mechanism shown in FIG. 2 and taken in cross section along the line 7—7.
Figure 5:
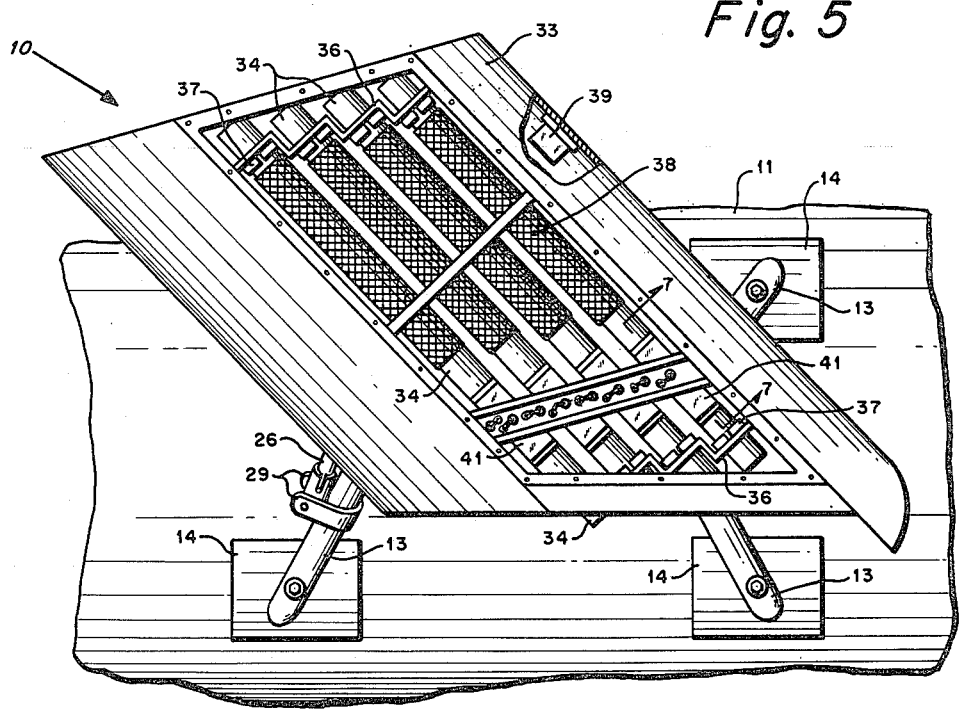
FIG. 5 represents a side elevation view of the rocketsonde launcher of FIG. 1 with its outboard side panel removed to show the structural details therein.

The during-burning solution for the effective trajectory D involves only a small portion of the total trajectory as illustrated in FIG. 3. For example, using a conventional 2.75-inch rocket motor in the rocketsonde 12, trajectory D deals only with the first two seconds of flight, while the overall flight time is at least forty-six seconds.

In the final position, point A, of the rocketsonde 12 of the during-burning solution, the effective trajectory angle is $\gamma'$, the distance is $s_b$ and the velocity at burnout is $v_b$. These conditions define the initial parameters for the after-burning solution. Insofar as the after-burning solution is concerned, the wind may be neglected as a torque-producing force because a further flip of the rocketsonde is unlikely since the magnitude of its velocity is large compared to the wind velocity. This does not mean that the rocketsonde will lose its horizontal component of velocity, which is equal to the velocity of the aircraft 11.

Figures 2A, 2B, 2C:
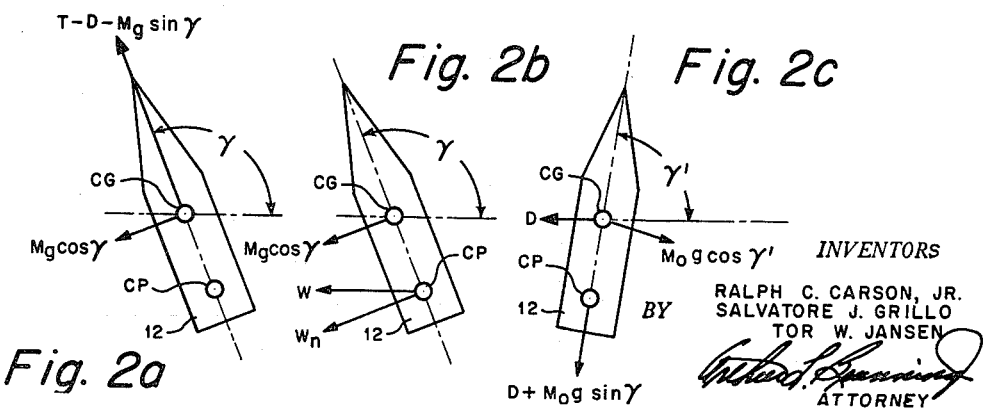

The equations of motion along the trajectory, illustrated vectorially in FIG. 2(c), is $$Mo\frac{dv}{dt} = -D' - M_o g \sin\gamma' \quad (9)$$

and $$Mo\frac{dx}{dx} = -D'' + M_o g \cos\gamma' \quad (10)$$

wherein $Mo$ = mass of the empty rocketsonde,
$D'$ = frontal drag of the rocketsonde, and
$D''$ = side drag of the rocketsonde.

In applications where the mean effective trajectory D′ is vertical ($\gamma' = 90°$), the second derivatives of Equations 9 and 10 are $$\frac{d^2y}{dt^2} = -\frac{D'}{M_o} - g \quad (11)$$

and $$\frac{d^2x}{dt^2} = -\frac{D''}{M_o} \quad (12)$$

The drag used in the during-burning solution is not applicable here, but is simply $$D' \text{ or } D'' = ae^{-by}v^2$$

Thus, Equations 11 and 12 are $$\frac{d^2y}{dt^2} = \frac{-a'}{M_o}e^{-by}\left(\frac{dy}{dt}\right)^2 - g \quad (13)$$

and $$\frac{d^2x}{dt^2} = \frac{-a''}{M_o}e^{-by}\left(\frac{dx}{dt}\right)^2 \quad (14)$$

The numerical solution of Equations 13 and 14 is ideally suited to the Taylor series method and continuing with Milne's method and results in the trajectory E.

The complete rocketsonde 12 trajectory, therefore, is the composite of trajectory D (or D′) and trajectory E.

The foregoing analysis of the trajectory of the rocketsonde 12 fired from an aircraft 11 thus contemplates a method and apparatus for producing a desired effective trajectory D which can be predicted for preselected angles of launching and airspeeds of the aircraft 11 for a given type of rocketsonde 12. Either the airspeed or the launcher angle, $\gamma$, may be varied to obtain an apogee at a desired altitude, the maximum altitude obtainable being when the mean effective trajectory D′ is vertical (viz $\gamma = 90°$).

Figure 6:
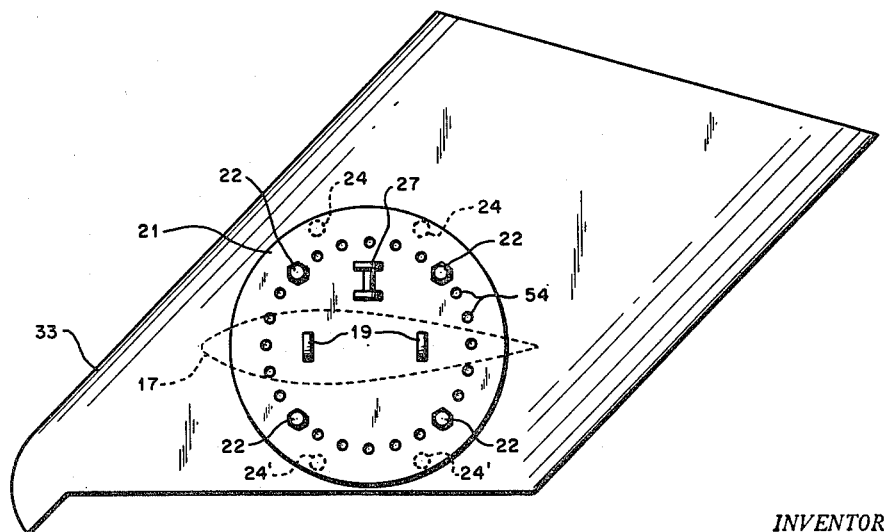
FIG. 6 represents a side elevation view of the inboard side of the rocketsonde launcher of FIG. 1 when removed from its pylon.

The construction of the launcher 10 may be best described with reference to FIGS. 4, 5, 6 and 7. The launcher 10 is primarily supported by a quadrupod 13 on the fuselage of the aircraft 11. The quadrupod 13 illustrated is of rigid tubular structure bolted to rigid aircraft structure at its four leg extremities respectively through mounting plates 14, but the particular support and connecting structure may take any convenient form consistent with good design practice. A central section 16 of the quadrupod 13 has a launcher rack 17 mounted thereon and is of the type used to carry and release bombs, fuel tanks and the like. The launcher rack 17 is oriented with its longitudinal axis running substantially parallel to the airstream and has a streamlined outer profile as shown by the broken line in FIG. 6. A pair of movable hooks arranged in tandem in the rack 17 engage corresponding lugs 19 on an adjustable plate 21. By means of a remotely actuated motor in the rack 17, the hooks can be moved out of engagement with the lugs 19 thereby to release or jettison the launcher 10. In the illustrated embodiment, FIG. 6 shows a plurality of bolt holes 54 arranged concentrically and equiangularly about the center of the plate 21 with four of the holes 54 aligned with four bolts 22 fixed to the launcher 10. By selecting any four holes 54 which correspondingly align with the bolts 22, the angular position of the launcher 10 relative to the aircraft 11 line of flight can be varied. The illustrated embodiment requires that the selection and orientation be made before the aircraft 11 is airborne; but it is contemplated that the plate 21 could be rotated relative to the launcher 10 by a conventional servo system operable during flight from a remote location such as the cockpit of the aircraft 11. By such means, the angle of launching, $\gamma$, for a given speed may be varied to obtain a desired effective trajectory D.

A pair of anti-sway braces 23 extend upwardly and transversely from the central section 16 terminating with adjustable chocks 24 which confront the inboard surface of the adjustable plate 21 when the lugs 19 are engaged on the hooks of the launcher rack 17. A similar pair of braces 23' extend downwardly from said central section 16 and include adjustable chocks 24'. The chocks 24 and 24' are adjustable for maintaining positive contact of the lugs 19 with the hooks of the rack 17 and for maintaining a fixed orientation of the launcher 10 on the aircraft 11.

If jettisoning of the launcher 10 is desired, the remote-actuated motor in the launcher rack 17 is actuated to release its hooks from the lugs 19, whereupon the launcher 10 may fall freely away from the aircraft 11. To insure against the airstream tending to direct the released launcher 10 against the aircraft 11, a swivel arm 26 is provided which is pivotally connected to the adjustable plate 21 by a pin 27 with its opposite end slidably inserted in a socket 28. A bracket 29 fixed to a lower rearward leg of the quadrupod 13 pivotally supports the socket 28. For the tubular structure illustrated, a keyway 31 is provided at the free end of the socket 18 to accommodate a stud 32 fixed at the free end of the arm 26 thereby preventing rotation of the latter. The swivel arm 26 thus restricts the released launcher 10 to falling away from the aircraft 11 and permits it to continue to fall as the swivel arm 26 slides out of the socket 28.

The launcher 10 includes a hollow fairing 33 of streamlined outline as viewed along the launching angle, FIG. 4. In the side elevation view of FIG. 5, a panel section on the outboard side of the fairing 33 intermediate of its leading and trailing portions has been removed to show structure contained therein. The launcher 10 contains eight launcher tubes 34 arranged in parallel in two rows of four each by two stepped brackets 36. One bracket 36 is located near the upper ends of the tubes 34 and the other at the lower ends and are rigidly fixed to the fairing 33. Adjustable clamps 37 fixed to the brackets 36 grip each of the tubes 34 against sliding and may be individually loosened to replace one of the tubes 34 without disturbing the others. The clamp 37 should be thermally non-conducting and heat resistant. Materials such as phenolic resin are contemplated therefor.

Maximum initial thrust of a rocket often requires moderate temperatures immediately before firing; and in the rocketsonde application the delicate instrumentation precludes low ambient temperatures. In order to insure optimum temperature conditions in otherwise low temperature environments such as contemplated for in the rocketsonde 12, an electrical heater 38 is wrapped around each of the tubes 34. Temperature regulation is effected by a thermostat 39 through electrical connections which have not been illustrated for reasons of clarity.

Each launcher tube 34 includes a latch mechanism 41 fastened on the outer side thereof for retaining its rocketsonde 12 in the launcher tube 34 until firing. The latch mechanism 41 includes a housing 42 in which one end of a latch 43 is pivotally connected by a latch pin 44. The other or movable end 45 of the latch 43 is urged through a slot 47 in the wall of the tube 34 by means of a latch spring 48. A raised portion 49 of the latch 43 located intermediate of the pin 44 and the movable end 45 extends into the tube 34 for abutting an annular shoulder of the rocketsonde 12, illustrated by the broken lines, when the latter is in its firing position. In the firing position, the force of the raised portion 49 through the spring 48 is varied by an adjusting screw 51 to obtain a sufficient lateral pressure between the rocketsonde 12 and the side of the tube 34 to prevent sliding under normally expected accelerations. The movable end 45 is also inclined so that the jet of the rocketsonde 12 when fired will impinge thereon and remove the lateral pressure by causing the latch 43 to rotate about pin 44. The latch 43 may be moved manually to the unlatching position by means of a connector 52 which extends out of the housing 42 into a channel 53 fixed to the fairing 33 on the outboard side of all of the tubes 34. It is contemplated that the connectors 52 be gang-operated by a single pull cord, not shown, for simultaneous release.

It is thus apparent that the usefulness of conventional rockets of relatively low power has been considerably extended. Due to the adaptability of the rocket launcher to aircraft, greater altitudes can be obtained for a given rocket because the altitude of launching may be the altitude of the aircraft, the launching station may be quickly moved over a wide area of interest, and an upward trajectory characterization is obtained and utilized which is especially adaptable for use with radiosonde equipment. As a rocketsonde in weather investigations, the present invention permits an operator to investigate weather conditions at a prescribed altitude simply by adjusting the angle of launching to a value correlated with the speed of the launching vehicle to obtain a predictable trajectory for the rocketsonde.

The invention further affords a safe, outboard launcher installation, unaffected by low temperatures, whereby a rocket can be fired or the launcher can be jettisoned in simple operations.

It will be understood that various changes in the details, materials, and arrangement of parts which have been herein described and illustrated in order to explain the nature of the invention, may be made by those skilled in the art within the principle and scope of the invention as expressed in the appended claims.

What is claimed is:

1. Apparatus for launching a meteorological rocket from aircraft in motion, said rocket having its center of pressure rearwardly displaced from its center of gravity, comprising, in combination: a hollow fairing having a plurality of launcher tubes therein, thermally nonconducting bracket means connecting said tubes to said fairing in parallel relationship, heating means connected within said fairing and adjacent to said tubes adapted for maintaining a predetermined operating temperature in any rockets inserted in said tubes, a latch means connected on and resiliently extending into the side of each of said tubes for laterally abutting and latching each inserted rocket in a firing position along the length of each of said tubes, said extending end of said latch means confronting the exhaust nozzle of the inserted rocket whereby the impinging jet from the rocket when fired urges said latch means out of abutment with the rocket, latch adjusting means respectively connected between each of said tubes and said latch means for varying the impinging force required for unlatching, manual means included in said latch means for selectively releasing the rocket, fairing support means formed to be fixed on rigid structure of the aircraft, and launch angle adjusting means coupled to said support means and said fairing for varying the angular position of said fairing relative to the fore and aft axis of the aircraft; whereby the angle of launching may be varied with the velocity of the aircraft to form a vertical obtuse angle with the forward direction of the aircraft and to obtain a substantially vertical trajectory of the rocket when fired.

2. Apparatus as set forth in claim 1 further comprising: a remotely actuated release rack connected between said support means and said adjusting means for releasing said fairing.

References Cited in the file of this patent

UNITED STATES PATENTS

| | | |
|---|---|---|
| 2,717,309 | Campbell | Sept. 6, 1955 |
| 2,771,811 | Lauritsen | Nov. 27, 1956 |
| 2,844,073 | Re et al. | July 22, 1958 |
| 2,848,925 | Hood | Aug. 26, 1958 |
| 2,918,004 | Denoven et al. | Dec. 22, 1959 |
| 2,938,434 | Myron | May 3, 1960 |
| 3,007,410 | Blacker | Nov. 7, 1961 |
| 3,018,692 | Bilek | Jan. 30, 1962 |

OTHER REFERENCES

Aviation Week, August 5, 1957, pp. 76 and 77, Farside Rocket To Fire Through Balloon (copy in Div. 10).